(12) United States Patent
Oldenettel et al.

(10) Patent No.: US 6,435,020 B1
(45) Date of Patent: Aug. 20, 2002

(54) METHOD FOR ALLOCATING TIRE PRESSURE CONTROL DEVICES TO WHEEL POSITIONS IN A TIRE PRESSURE CONTROL SYSTEM OF A MOTOR VEHICLE

(75) Inventors: Holger Oldenettel, Garbsen; Wolfgang Klodmann, Nienburg; Holger Behrends; Gerhard Ernst, both of Hannover, all of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/567,141

(22) Filed: May 8, 2000

Related U.S. Application Data

(63) Continuation-in-part of application No. 09/131,910, filed on Aug. 10, 1998, now Pat. No. 6,112,587.

(30) Foreign Application Priority Data

May 8, 1999 (DE) .......................................... 199 21 413

(51) Int. Cl.$^7$ ................................................ B60C 23/04
(52) U.S. Cl. ...................... 73/146.4; 340/445; 340/446; 340/447
(58) Field of Search ................................ 73/146.5, 146, 73/146.3, 146.4, 146.8; 340/445, 442, 446, 447, 448

(56) References Cited

U.S. PATENT DOCUMENTS 3,810,090 A * 5/1974 Davis, Jr. et al. ............. 340/58
5,808,190 A * 9/1998 Ernst .......................... 116/34 R
6,112,587 A * 9/2000 Oldenettel ................... 73/146.5
6,237,403 B1 * 5/2001 Oldenettel et al. ........... 340/445

FOREIGN PATENT DOCUMENTS

DE 4205911 9/1993
EP 0895879 2/1999

* cited by examiner

Primary Examiner—Eric S. McCall
(74) Attorney, Agent, or Firm—Walter Ottesen (57) ABSTRACT

The invention relates to a method for carrying out the allocation of tire pressure control devices (4a to 4d) to wheel positions in a tire pressure control system of a motor vehicle. Each tire pressure control device (4a to 4d) transmits, at certain time intervals, its individual identifier and a lengthened high frequency signal to the central unit (10) of the tire pressure control system. The high frequency signals have an individual trace which is dependent upon the rotational angle of the wheel and on the time because of the geometry of the wheel box and as a consequence of the rotation of the wheel. In the central unit (10), a time point is fixed from two sequential high frequency signals at which the wheel assumes the same angular position in each case with this wheel being the wheel from which the signals were transmitted. The corresponding wheel has made an integer number of revolutions between the two time points. In the central unit (10), with the aid of the signals of the rpm sensors (12a to 12d), the wheel position is determined in which the wheel has made an integer number of revolutions between the two time points. The corresponding wheel position is allocated to the individual identifier transmitted from the tire pressure control device (4a to 4d).

12 Claims, 6 Drawing Sheets

FIG.1

METHOD FOR ALLOCATING TIRE PRESSURE CONTROL DEVICES TO WHEEL POSITIONS IN A TIRE PRESSURE CONTROL SYSTEM OF A MOTOR VEHICLE

RELATED APPLICATION

This is a continuation-in-part application of U.S. patent application Ser. No. 09/131,910, filed Aug. 10, 1998, (now U.S. Pat. No. 6,112,587) and claiming priority of German patent application 197 34 323.6, filed Aug. 8, 1997.

BACKGROUND OF THE INVENTION

For reasons of safety, the tire pressure of motor vehicles must be checked regularly and this is often neglected by the driver of the motor vehicle for various reasons. For this reason, tire pressure control systems have already been developed which include a tire pressure control device on each wheel which automatically measures the tire pressure of the tires of the motor vehicle and announces to the driver of the motor vehicle at least a critical deviation from a desired tire pressure. The tire pressure control devices can, for example, be vulcanized into the tires or can be mounted with adhesive or can be attached on or in the valve or on or in the wheel rim. Appropriate configurations are known.

U.S. patent application Ser. No. 09/131,910, filed Aug. 10, 1998, discloses a tire pressure control system wherein a tire pressure control device is assigned to each tire of the motor vehicle. At regular intervals, a tire pressure control device transmits a measured pressure signal together with an individual identifier to a central unit. Because of the transmission of an individual identifier, the situation is avoided that the data, which are transmitted to the central unit, are, for example, mistaken for data which are transmitted by another motor vehicle. In the central unit, value pairs of the form (identifier of the tire pressure control device/wheel position) are stored for each wheel of the motor vehicle so that by a corresponding comparison in the central unit, a conclusion can be drawn as to which identifier with the pressure signal corresponding thereto is transmitted from which wheel position of the motor vehicle. A deviation of the transmitted pressure signal from a pregiven value at a wheel position is displayed to the driver of the motor vehicle by the central unit so that the driver can initiate suitable measures.

The embodiments show that the tire pressure control system, which is known from U.S. patent application Ser. No. 09/131,910, can only function without problems when the allocations (identifier of the tire pressure control device/ wheel position) are correctly stored in the central unit. Correspondingly, a new allocation must be undertaken at least after each change of tires. In the above-identified patent application, this new allocation takes place in the known tire pressure control system as follows: each tire pressure control device is assigned an rpm sensor which is switched on for a first time interval. During the first time interval, a first defined angular position of the wheel (to which the rpm sensor is assigned) is determined from the signal of the rpm sensor. The individual identifier is transmitted by the tire control device to the central unit at a first time point $t_1$ at which the wheel assumes this first defined angular position. The same rpm sensor is later switched on for a second time interval during which the same defined angular position of the wheel is determined from the signal of the rpm sensor as in the first interval. The tire pressure control device transmits its individual identifier to the central unit at a second time point $t_2$ in which the wheel assumes this defined angular position. The central unit knows that the wheel (from which the individual identifier has been transmitted) has made an integer number of revolutions between the time points $t_1$ and $t_2$. A check is now made in the central unit as to from which rpm sensor or from which wheel position an integer number of revolutions was transmitted between the time points $t_1$ and $t_2$. The rpm sensors are sensors of a slip control system and are each fixedly mounted at a location. The corresponding wheel position is assigned in the central unit to the individual identifier transmitted from the tire pressure control device. The remaining tire pressure control devices of the motor vehicle are assigned to their wheel positions in the same manner.

A reliable allocation of the tire pressure control devices to the wheel positions in a tire pressure control system of a motor vehicle is possible with the method disclosed in U.S. patent application Ser. No. 09/131,910, filed Aug. 10, 1998. However, the tire pressure control system requires an rpm sensor in every tire pressure control device which drives up the cost of the system. Furthermore, the rpm sensors are a load on the batteries of the tire pressure control devices even though they are switched on only during short time intervals. In this way, the service life of the batteries is reduced so that the high service life of the batteries which is sought is realizable only with difficulty.

A tire pressure control system is disclosed in German patent publication 4,205,911 wherein a new allocation is carried out in that the intensity of the signals (transmitted by the individual tire pressure control devices) is measured by receivers with each receiver being permanently assigned to a corresponding one of the wheel positions and each signal transmitted from a pressure control device is allocated to the wheel position at which the highest signal intensity is generated. For example, the signal intensity of the tire pressure control device, which is located in the forward left tire, will be largest at the receiver which is allocated to the forward left wheel position so that a corresponding allocation can be determined. The respective allocations are stored in the central unit.

For the allocation method explained above, a receiver is needed at each wheel position of the motor vehicle whereby the costs of the tire pressure control system disclosed in German patent publication 4,205,911 are likewise increased.

SUMMARY OF THE INVENTION

It is an object of the invention to provide a method for allocating the tire pressure control devices to the wheel positions in a tire pressure control system of a motor vehicle which can be carried out with a cost-effective tire pressure control system.

The method of the invention is in the context of a tire pressure control system of a motor vehicle having a plurality of wheels at respective wheel positions. The method is for allocating tire pressure control devices of the tire pressure control system to the wheel positions of the motor vehicle during the operation of the motor vehicle. The system further includes: a central unit; the tire pressure control devices being assigned to corresponding ones of the wheels; each of the tire pressure control devices functioning to transmit an individual identifier to the central unit at time intervals; a plurality of rpm sensors assigned to corresponding ones of the wheels and the rpm sensors being fixedly mounted at respective ones of the wheel positions with the allocation of the rpm sensors to the wheel positions being known by the central unit; and, the central unit storing the allocation (identifier of the tire pressure control device/ wheel position) for each of the wheels; the method including the steps of: causing one of the tire pressure control devices assigned to one of the wheels to transmit to the central unit, at any desired time point, its own individual identifier and a first lengthened high frequency signal, which extends over a first time interval $I_1$; and, as a consequence of a rotation of the one wheel, the signal having an individual trace dependent upon the rotational angle of the one wheel and/or upon the time; causing the one tire pressure control device to transmit to the central unit, at any desired later time point, its own individual identifier and a second lengthened high frequency signal, which extends over a second time interval $I_2$, the second lengthened high frequency signal having the same individual trace at least segmentwise as the first lengthened high frequency signal, the individual trace of the second lengthened high frequency signal being dependent upon time and/or the rotational angle of the one wheel; in the central unit, determining a first time point at which the one wheel assumes a desired relative angular position from the trace of the first lengthened high frequency signal; in the central unit, determining a second time point at which the one wheel assumes the same relative angular position as the one wheel assumed at the first time point and the second time point being determined from the trace of the second lengthened high frequency signal; in the central unit, determining the number of revolutions which the wheels have made in a third time interval $I_3$ from the first time point to the second time point and the number of revolutions for the wheels being determined from the signals of the rpm sensors; in the central unit, checking which one of the wheels in which one of the positions had made an integer number of revolutions; and, in the central unit, assigning the corresponding wheel position to the individual identifier transmitted from the one tire pressure control device.

With respect to the term "lengthened high frequency signal", the following is noted. Each tire pressure control device transmits its data (that is, especially its individual identifier and the pressure signal) in the form of high frequency signals. A lengthened high frequency signal is a high frequency signal which is significantly longer than the high frequency signals which are conventionally transmitted by a tire pressure control device. A significantly longer signal is one which is longer by at least one order of magnitude.

Preferably, each lengthened high frequency signal is transmitted by the tire pressure control device at a constant maximum amplitude. The constant maximum amplitude, as a consequence of the rotation of the wheel, defines an individual trace in dependence upon the rotational angle of the wheel and/or on the time. The one wheel is that wheel from which the lengthened high frequency signal is transmitted.

The invention also utilizes the situation that the constant maximum amplitude of a transmitted high frequency signal receives an individual trace which is dependent upon the rotational angle of the wheel and/or on the time so that a conclusion can be drawn based on the signal trace as to the relative angular position of the wheel. The individual trace is probably caused by the different geometric characteristics in the wheel boxes of the motor vehicle and by the time-dependent change of the spacing of a tire pressure control device to the wheel box as the device rotates relative to the wheel box.

The advantages achieved with the invention are especially seen in that, for carrying out the method, neither a receiver at each wheel position (as in German patent publication 4,205,911) nor an rpm sensor in each tire pressure control device (as in the above-mentioned U.S. patent application Ser. No. 09/131,910) is needed. Rather, for carrying out the invention, no components are needed which are otherwise present in the tire pressure control system or in the vehicle (such as the rpm sensors, which are components of a slip control system). In this way, the allocation method is carried out with the aid of a cost-effective tire pressure control system. Further advantages of the invention are seen in that the allocation system operates as reliably as the allocation methods known to date and the batteries of the tire pressure control devices are loaded only slightly.

According to another feature of the invention, each time interval during which a lengthened high frequency signal is transmitted from a wheel is at least so long that the wheel makes at least one rotation in the time interval. The advantage of this embodiment is that the first and second lengthened high frequency signals, which are transmitted from a tire pressure control device, have perforce over some regions the same time-dependent trace from which a conclusive angular position can be determined.

According to another feature of the invention, a specific time duration is pregiven in each tire pressure control device which is the same for all lengthened high frequency signals transmitted from this tire pressure control device. Preferably, the time duration is so dimensioned that the probability is very high that the wheel makes a whole revolution during the transmission of the lengthened high frequency signal or the speed of rotation is very low for the wheel to which this condition applies. In this case, it is given with high probability that the first and second lengthened high frequency signals transmitted by a tire pressure control device are coincident at least over some regions with each other. The advantage of this embodiment is that it is easily realized.

According to another embodiment of the invention, each one of the tire pressure control devices has a centrifugal force sensor, which generates a signal above a pregiven number of revolutions of the wheel to which the one tire pressure control device is assigned; and, the one tire pressure control device transmits a lengthened high frequency signal only when the signal of the centrifugal force sensor is present.

The length is pregiven in dependence upon the pregiven number of resolutions at which the centrifugal force sensor generates a signal so that it is ensured that the wheel makes at least one whole revolution during the transmission of the lengthened high frequency signal. Thus, if the centrifugal force sensor generates the signal at x revolutions per minute, then a time of at least 1/x minutes is pregiven for the length of the lengthened high frequency signal. The advantage of this embodiment is that the first and second high frequency signal transmitted by a tire pressure control device are coincident with certainty at least over some regions.

According to still another embodiment of the invention, the tire pressure control system has a central transmitter and each of the tire pressure control devices has a receiver; and, the method includes the further steps of: the central transmitter transmitting a signal to all of the tire pressure control devices; and, directly after receiving the signal, each of the tire pressure control devices transmitting a lengthened high frequency signal to the central unit.

The high frequency signal is transmitted by the tire pressure control devices. Preferably, the central transmitter additionally sends data as to the length of this lengthened high frequency signal to the tire pressure control devices. A length which is dependent upon the vehicle speed is preferably transmitted and this length is so dimensioned that it is ensured that the lengthened high frequency signals are at least so long that each wheel, from which a lengthened high frequency signal is transmitted, makes at least one revolution during the transmission and, in this way, the advantages already mentioned above are attained.

According to another feature of the invention, the allocation method is started by actuating a switch. The switch is preferably actuated by the driver of the motor vehicle. The advantage of this embodiment is that the allocation method is only carried out when it is necessary, for example, after a tire has been exchanged.

According to still another embodiment of the invention, the allocation method is started automatically after switching on the ignition of the motor vehicle when the ignition had been previously switched off for a pregiven time span. The pregiven time span is selected so that an exchange of tires could have taken place in this time which would make a new allocation necessary, that is, approximately 10 to 30 minutes. The advantage of this embodiment is that the method is carried out automatically only when a new allocation could be necessary.

In another embodiment of the invention, the signals, which are transmitted by the tire pressure control devices, are amplitude modulated and each lengthened high frequency signal is a separate signal which is transmitted at a constant maximum amplitude.

According to another embodiment of the invention, the signals which are transmitted by the tire pressure control devices, are frequency modulated and are transmitted at constant maximum amplitude. The individual identifier is contained in the lengthened high frequency signal.

According to still another embodiment of the invention, the first and second time points at which the wheel assumes a coincident relative angular position is determined by cross correlation in the first and second lengthened high frequency signals. In cross correlation, a conventional mathematical method is used as will be described hereinafter. The advantage of this additional embodiment is that a coincident relative angular position can be reliably found in the lengthened high frequency signal in a simple manner.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
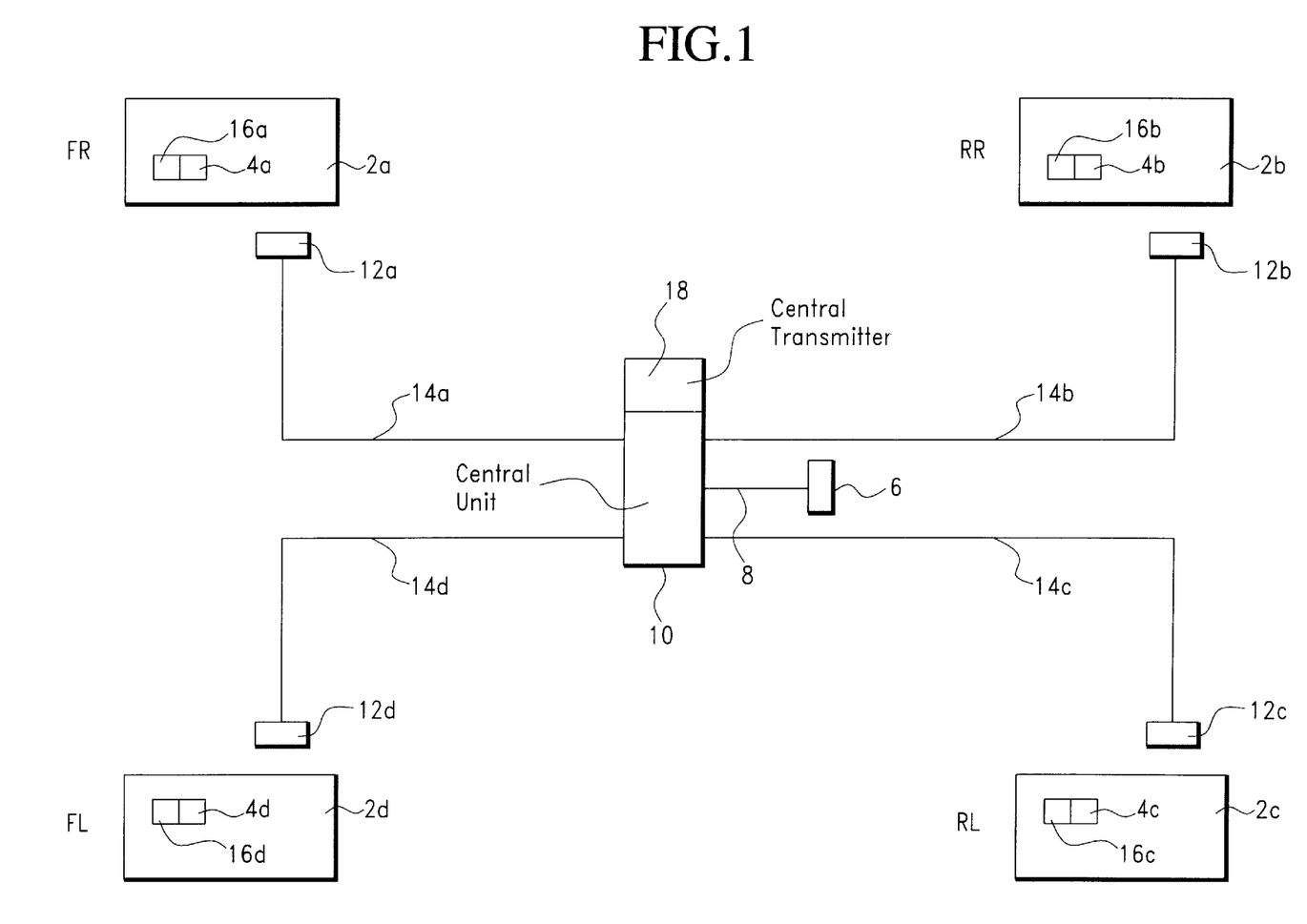
FIG. 1 is a schematic block diagram of the tire pressure control system according to the invention.

FIG. 1 shows a schematic representation of a motor vehicle having four wheels 2a to 2d and which is equipped with a tire pressure control system. The tire pressure control system includes, inter alia, tire pressure control devices 4a to 4d mounted in respective ones of the tires of the wheels 2a to 2d (for example, in the tire rubber or in the valve). On the other hand, the tire pressure control devices 4a to 4d can be assigned to respective ones of the tires, for example, by corresponding positioning and attachment to the wheel rim. The tire pressure control devices 4a to 4d include transmitters with the aid of which the control devices can transmit data in the form of high frequency signals to a receiver 6 without contact (wireless transmission). The receiver 6 transmits the data, which are received from the tire pressure control devices 4a to 4d, via the transmission path 8 to a central unit 10. In the simplest case, the receiver 6 is configured as a receiving antenna with the aid of which the central unit 10 receives the transmitted data. The tire pressure control system further includes rpm sensors 12a to 12d which are attached to the motor vehicle and are fixedly assigned to respective wheels 2a to 2d of the motor vehicle. The rpm sensors 12a to 12d communicate via transmission paths 14a to 14d, respectively, with the central unit. The central unit 10 can assign the signal of one of the rpm sensors 12a to 12d to a wheel position based on the transmission path. For example, if a signal is applied to the transmission path 14a, then this is an indication for the central unit 10 that this signal is transmitted from the rpm sensor 12a which is in the wheel position "forward right". In FIG. 1, the wheel positions are identified as follows: forward right with FR, rearward right with RR, rearward left with RL and forward left with FL. How the signals of the rpm sensors 12a to 12d individually appear will be explained in connection with FIG. 2.

In normal operation, the tire pressure control devices 4a to 4d transmit respective individual identifiers and pressure data to the central unit 10. There, the transmitted pressure data are evaluated and are compared to pregiven pressure data. If the transmitted pressure data deviate over a pregiven amount from the pregiven pressure data, then this is indicated to the driver of the motor vehicle by the central unit 10.

The tire pressure control devices 4a to 4d are assigned to the wheel positions in the tire pressure control system in an allocation mode. In this allocation mode, each tire pressure control device 4a to 4d transmits a lengthened high frequency signal to the central unit 10 in time-dependent intervals in addition to the individual identifiers and, as required, the pressure data. An allocation of the tire pressure control devices 4a to 4d to the wheel positions is carried out in the central unit 10 with the aid of the lengthened high frequency signals and the signals transmitted to the central unit 10 from the rpm sensors 12a to 12d. This will be explained with respect to the figures which follow.

Each of the transmitted high frequency signals is preferably so long that the corresponding wheels 2a to 2d from which the signal was transmitted make at least one revolution during the duration of the signal. This can, for example, be substantially ensured in that a time duration for the lengthened high frequency signals is pregiven in the tire pressure control devices 4a to 4d which is so selected that already for low speeds of the vehicle, each wheel 2a to 2d makes at least one revolution during this length.

Each tire pressure control device 4a to 4d can include a centrifugal force sensor 16a to 16d which generates a signal above a pregiven rpm of the wheel 2a to 2d. A tire pressure control device only sends a lengthened high frequency signal with the pregiven length when the signal of the centrifugal force sensor is present. The length of the lengthened high frequency signal is so matched to the number of revolutions (at which the centrifugal force sensor 16a to 16d generates a signal) that the wheel 2a to 2d makes at least one rotation during the transmission of the lengthened high frequency signal.

Alternatively, it is possible that the tire pressure control system includes a central transmitter 18 and each tire pressure control device includes a receiver (not shown). For triggering the allocation method, the central transmitter 18 sends a signal to all tire pressure control devices 4a to 4d which immediately transmit a lengthened high frequency signal to the central unit 10 directly after receiving the signal. Additionally, the central transmitter can transmit data as to the length of the lengthened high frequency signal which is intended to be transmitted from the tire pressure control devices 4a to 4d. The length is preferably pregiven by the central transmitter 18 preferably in dependence upon the speed of the vehicle in such a manner that it is ensured that each wheel 2a to 2d of the motor vehicle makes at least one revolution during the transmission of the lengthened high frequency signal.

Figure 2:
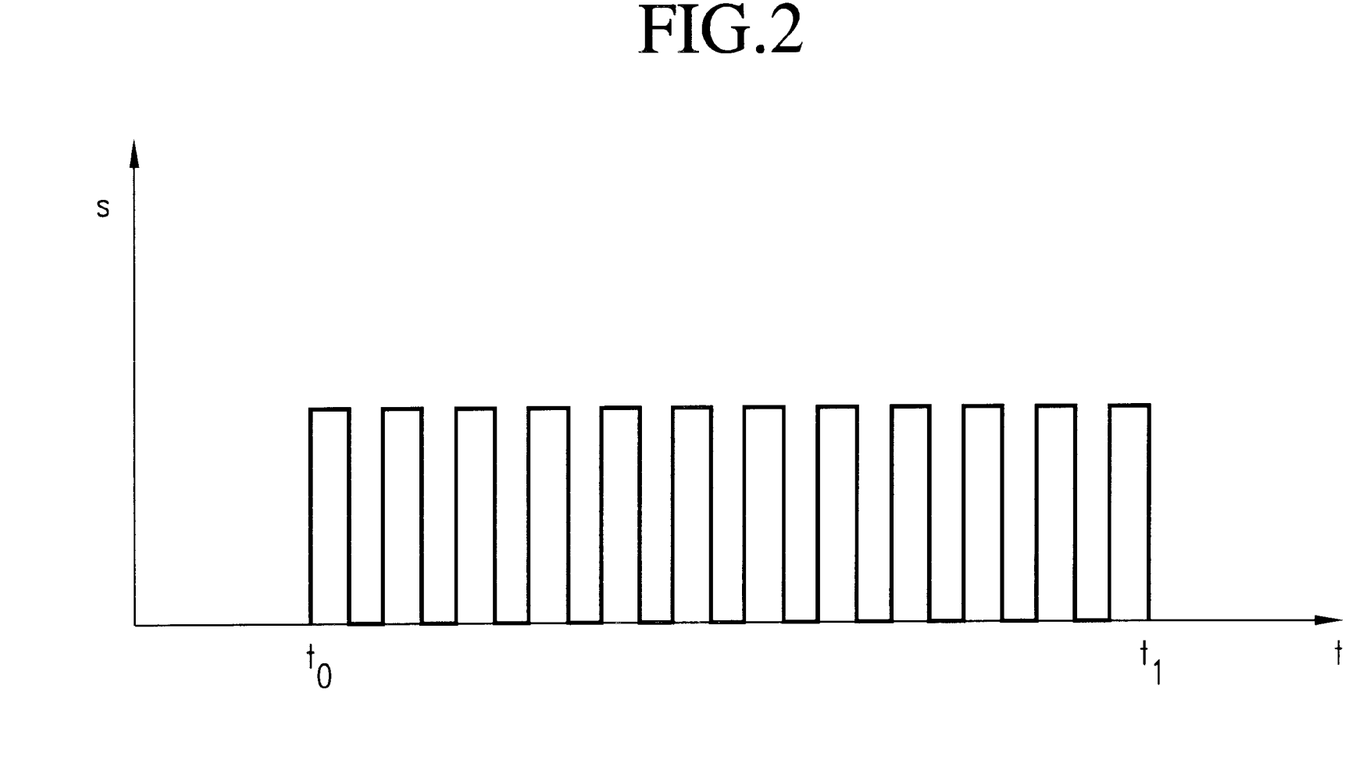
FIG. 2 shows the waveform of the signal generated by the rpm sensor plotted as a function of time.

FIG. 2 shows a diagram wherein the signal, which is generated by the rpm sensors 12a to 12d, is plotted as a function of time. The rpm sensors 12a to 12d can, for example, be sensors of a slip control system. These sensors are known per se and have toothed wheel discs having a certain number of teeth. With a full rotation of the vehicle wheels 2a to 2d, each tooth of the toothed wheel discs of the corresponding rpm sensors 12a to 12d generates a pulse so that, from the number of pulses between two time points, the number of revolutions between the time points can be computed in the central unit 10 (see FIG. 1). In the diagram shown in FIG. 2, it was, for example, assumed that the toothed wheel disc has six teeth. The diagram shows 12 signals between the time points $t_0$ and $t_1$. For this reason, the motor vehicle wheel 2a to 2d made two revolutions between these time points.

Figure 3A:
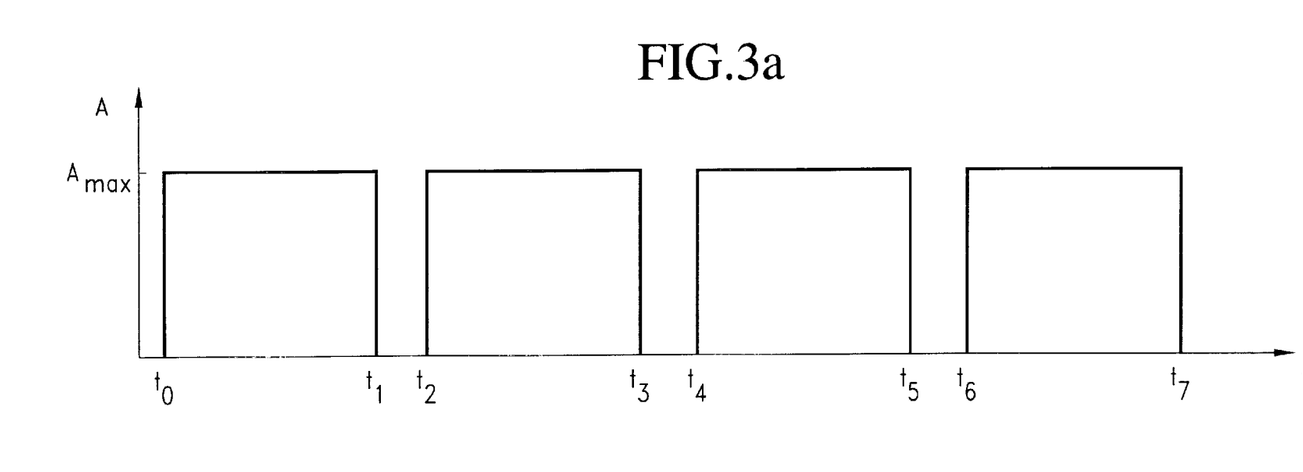
FIG. 3a is a diagram showing the magnitude of the amplitude of the high frequency signals which are generated by the tire pressure control devices plotted as a function of time.

FIG. 3a shows a diagram wherein the magnitude of the amplitude of the lengthened high frequency signals, which are generated by the tire pressure control devices 4a to 4d, is plotted as a function of time. The high frequency signal between the time points $t_0$ and $t_1$ is generated by the tire pressure control device 4a; the high frequency signal between the time points $t_2$ and $t_3$ is generated by the tire pressure control device 4b; the high frequency signal between the time points $t_4$ and $t_5$ is generated by the tire pressure control device 4c; and, the high frequency signal between the time points $t_6$ and $t_7$ is generated by the tire pressure control device 4d. From the diagram, it can be seen that the amplitude magnitude of each of the generated high frequency signals reaches the value $A_{max}$ during the entire length (actually, the high frequency signals are oscillation signals so that the maximum amplitude magnitude is reached twice during an oscillation operation; however, because the signal is a high frequency signal, both maximum values lie so close next to each other during an oscillation period that, simplified, only the "enveloping curve" of the amplitude magnitude is shown). The time intervals between the time points $t_0$ and $t_1$ or between $t_2$ and $t_3$, $t_4$ and $t_5$, $t_6$ and $t_7$ are so long that the corresponding motor vehicle wheel 2a to 2d (whose tire pressure control device has generated the lengthened high frequency signal) has made at least one revolution in the mentioned time intervals.

Figure 3B:
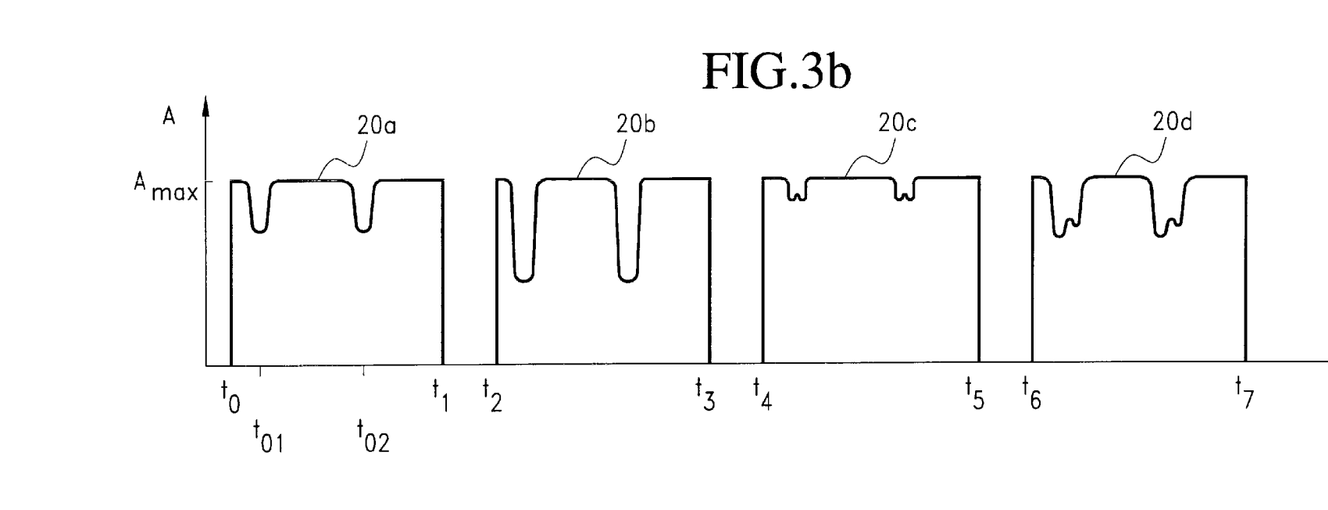
FIG. 3b is a diagram showing the amplitude magnitude of the lengthened high frequency signal received by the central unit as a function of time.

FIG. 3b shows a diagram wherein the amplitude magnitude of the lengthened high frequency signal, which is received by the central unit 10, is plotted as a function of time. From the diagram, it can be seen that the central unit 10 receives: a high frequency signal having the trace 20a in the time interval from $t_0$ to $t_1$ from the tire pressure control device 4a; a high frequency signal having the trace 20b in the time interval from $t_2$ to $t_3$ from the tire pressure control device 4b; a high frequency signal having the trace 20c in the time interval from $t_4$ to $t_5$ from the tire pressure control device 4c; and, a high frequency signal having the trace 20d in the time interval from $t_6$ to $t_7$. The received maximum amplitude of the high frequency signal 20a has substantially the maximum magnitude $A_{max}$ over the entire time interval from $t_0$ to $t_1$. The central unit 10 receives a clearly reduced maximum amplitude only in the region of the times $t_{01}$ and $t_{02}$. A trace of this kind of the amplitude received by the central unit 10 as a function of time is caused by the following. The tire pressure control device 4a rotates during the transmission of the lengthened high frequency signal with the motor vehicle wheel 2a. In this way, the tire pressure control device 4a always assumes a different position with respect to the wheel box or to the surface on which the wheel 2a stands. Because of interferences in the transmitted high frequency signal or other effects, the situation occurs that the amplitude of the high frequency signal no longer reaches the same maximum value in the entire time interval; instead, the amplitude changes in specific relative angular positions of the tire pressure control device 4a. A change of the transmitted amplitude always takes place in the same angular position of the tire pressure control device 4a. The central unit 10 therefore receives a lengthened high frequency signal 20a from the tire pressure control device 4a which exhibits an individual trace in dependence upon the rotational angle of the wheel and the time. The other high frequency signals 20b, 20c and 20d also have individual traces which are dependent upon the rotational angles of the corresponding wheels and on the time.

From the trace of the high frequency signal 20a, it can be seen that the wheel 2a (from where the lengthened high frequency signal was transmitted) assumes the same angular position at the time points $t_{01}$ and $t_{02}$. Therefore, between these two time points, a whole revolution has been made (in FIG. 3b, the time interval from $t_0$ to $t_1$ was selected to be so long that the motor vehicle wheel 2a makes approximately two revolutions between these two time points).

Figure 3C:
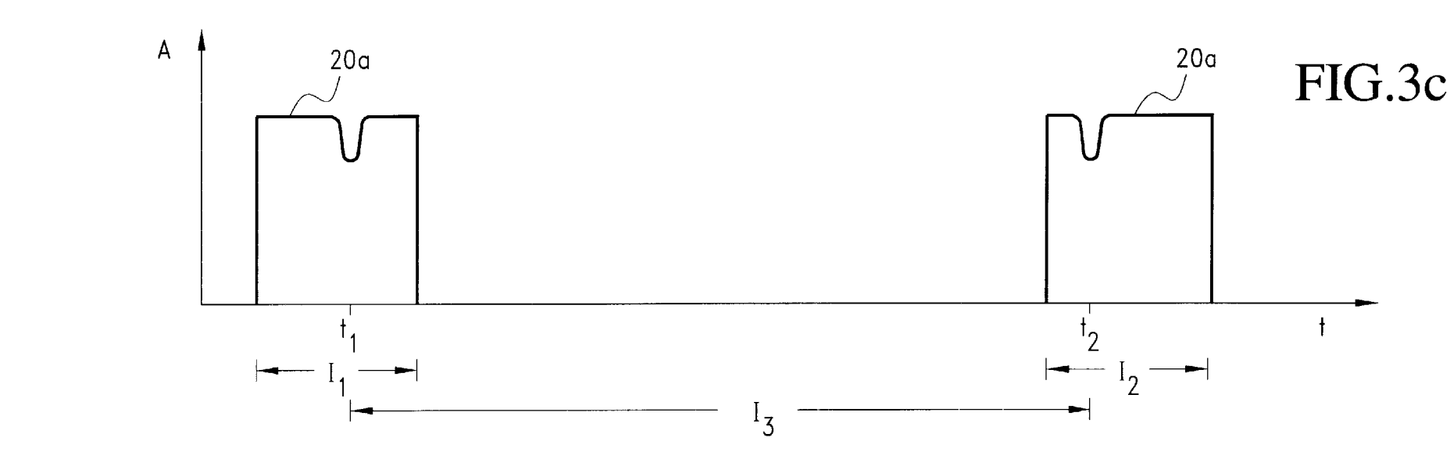
FIG. 3c is a plot of the lengthened high frequency signal utilized in allocating the tire pressure control device to the corresponding wheel position.

In connection with FIG. 3c, it will now be explained how, with the aid of the lengthened high frequency signal 20a, an allocation of the tire pressure control device 4a is made to the corresponding wheel position in which the control device is located. First, the tire pressure control device 4a sends its individual identifier to the central unit 10. Thereafter, the tire pressure control device 4a transmits to the central unit 10 a first lengthened high frequency signal 20a extending over a first time interval $I_1$. As a consequence of the rotation of the wheel, the lengthened high frequency signal 20a has an individual trace dependent upon the rotational angle of the wheel and/or upon the time so that the high frequency signal shown in FIG. 3c is received by the central unit 10. The same tire pressure control device 4a first again sends its individual identifier to the central unit 10 at a desired later time point. Furthermore, the tire pressure control device 4a transmits to the central unit 10 a second lengthened high frequency signal 20a extending over a second time interval $I_2$. Both time intervals are so long that the wheel 2a, which is assigned to the tire pressure control device 4a, makes at least one revolution in the corresponding time interval. In this way, both lengthened high frequency signals have, with certainty, the reduction of the amplitude of the high frequency signal explained in connection with FIGS. 3a and 3b, namely, the first lengthened high frequency 20a at the first time point $t_1$ and the second lengthened high frequency signal 20a at the second time point $t_2$. The reduction of the amplitude of the high frequency signals takes place in each case at the same angular position. For this reason, the wheel 2a, which has tire pressure control device 4a assigned thereto, makes an integer number of revolutions in the third time interval $I_3$ from $t_1$ to $t_2$. In the central unit 10, an evaluation is made as to how many signals have been transmitted in the time interval $I_3$ to the central unit from the rpm sensors 12a to 12d via the transmission paths 14a to 14d. Thereupon, a computation is made as to how many revolutions the wheels 2a to 2d have made in the time interval $I_3$ from the number of the transmitted signals. The wheels 2a to 2d are allocated to the rpm sensors 12a to 12d. The individual identifier, which is transmitted from the tire pressure control device 4a, is associated with that wheel position whereat the wheel has made an integral number of revolutions in the time interval $I_3$.

EXAMPLE

The following numbers of signals are transmitted from the rpm sensors 12a to 12d to the central unit 10 in the time interval $I_3$: rpm sensor 12a, 606 signals; rpm sensor 12b, 603 signals; rpm sensor 12c, 603 signals; and, rpm sensor 12d, 602 signals. In the central unit, the following rpms are computed from the above when one assumes that the toothed disc of the rpm sensors has six teeth: number of revolutions of wheel 2a=100.1; number of revolutions of wheel 2b=100.5; number of revolutions of wheel 2c=100.5; and, number of revolutions of wheel 2d=100.3. Accordingly, and in the time interval $I_3$, the wheel 2a in the wheel position "forward right" has made an integral number of revolutions. As a consequence, the individual identifier, which is transmitted by the tire pressure control device 4a, is assigned to the wheel position "forward right" in the central unit 10. The remaining tire pressure control devices 4b to 4d are assigned to wheel positions in the same manner.

Figure 3D:
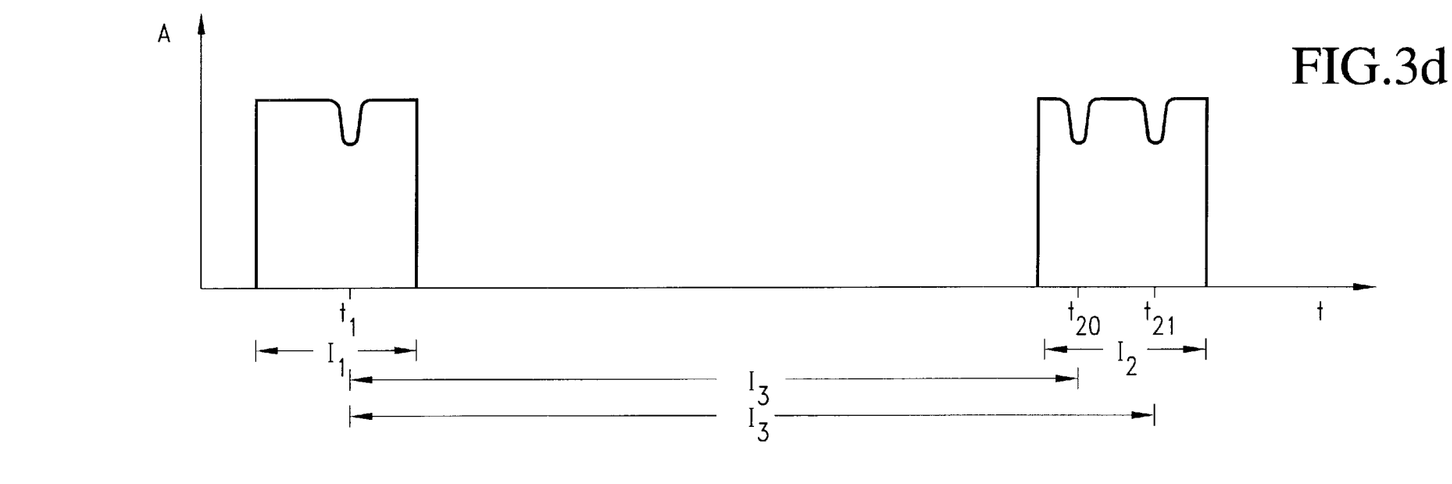
FIG. 3d corresponds substantially to the plot of FIG. 3c except that a reduction of the amplitude of the lengthened high frequency signal occurs twice.

FIG. 3d shows substantially the same diagram as FIG. 3c. The only difference is seen in that a reduction of the amplitude of lengthened high frequency signal occurs twice in the interval $I_2$; that is, the corresponding motor vehicle wheel assumes the corresponding angular position twice in which the reduction takes place. The interval $I_2$ is just as long as the interval $I_1$. Such a case situation can, for example, occur in that the motor vehicle wheel rotates in time interval $I_2$ at a greater speed than in time interval $I_1$. In this case, the time interval $I_3$ (in which the corresponding motor vehicle wheel has made an integer number of revolutions) is selected either from $t_1$ to $t_{20}$ or from $t_1$ to $t_{21}$ and one proceeds in correspondence to the procedure explained in connection with FIG. 3c.

In the embodiment explained in connection with FIGS. 3a to 3d, it was assumed that the lengthened high frequency signal, which is received by the central unit 10, exhibits a significant location for each rotation of the wheel, namely, a reduction of the amplitude of the high frequency signal at one location. In connection with FIGS. 4a to 4d, an embodiment of the invention is explained wherein the trace of the lengthened high frequency signal, which is received by the central unit 10, changes over the total revolution of the wheel with respect to the high frequency signal transmitted from the tire pressure control device.

Figure 4A:
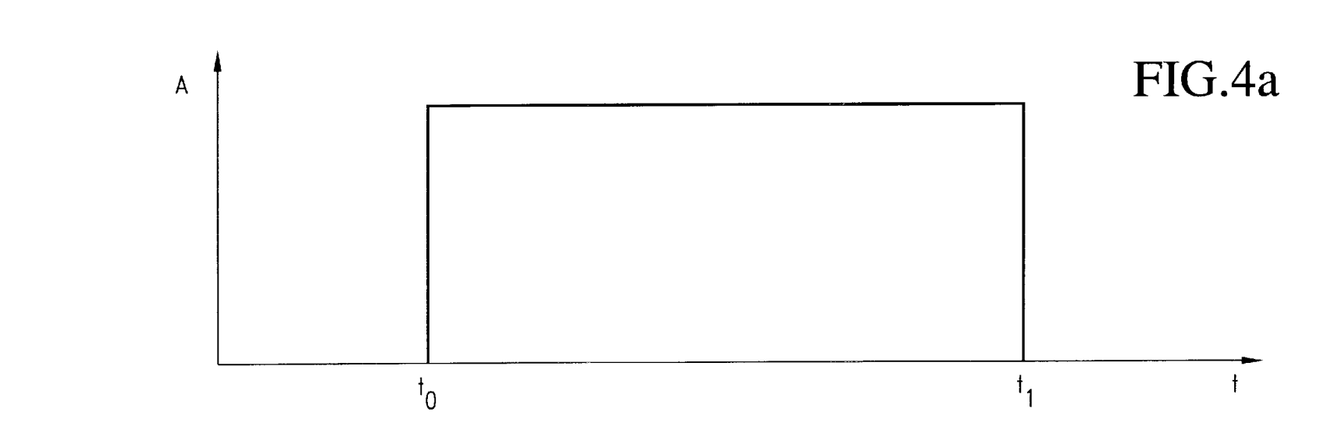
FIG. 4a is a plot of the magnitude of the amplitude of the lengthened high frequency signal plotted as a function of time and generated by one of the tire pressure control devices.

FIG. 4a shows a diagram wherein the magnitude of the amplitude of a lengthened high frequency signal is plotted as a function of time. The lengthened high frequency signal is generated by the tire pressure control device 4a. The high frequency signal is transmitted by the tire control device 4a in the time interval from $t_0$ to $t_1$. The diagram of FIG. 4a is like the diagram shown in FIG. 3a, so that reference can be made to the description corresponding thereto.

Figure 4B:
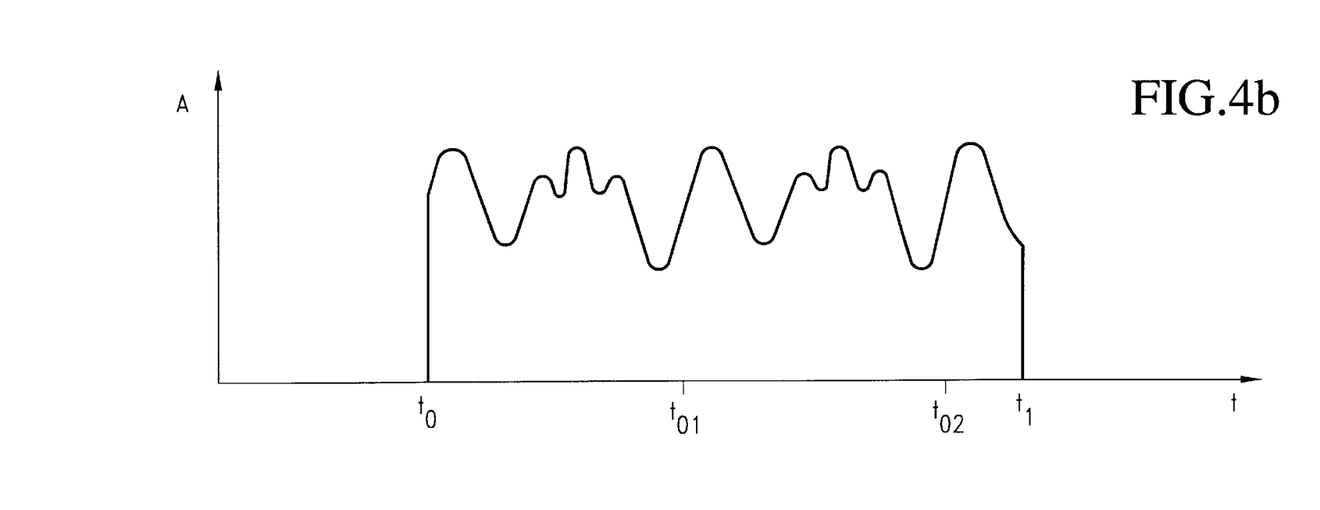
FIG. 4b is a plot of the magnitude of the amplitude, which is received by the cental unit, as a function of time.

FIG. 4b shows a diagram wherein the magnitude of the amplitude, which is received by central unit 10, is plotted as a function of time. Because of the rotation of the wheel and because of the changing angular position of the tire pressure control device 4a to the wheel box, the central unit 10 receives a lengthened high frequency signal which has an individual trace dependent upon the time and/or on the rotational angle of the wheel. The trace of the high frequency signal, which is received by the central unit 10, is dependent upon the rotational angle of the wheel. For this reason, the high frequency signal has a periodic trace. The length of the period is determined by the duration of a revolution of the motor vehicle wheel. In the example shown in FIG. 4b, a period covers a time interval from $t_0$ to $t_{01}$ or from $t_{01}$ to $t_{02}$ and the wheel 2a (from which the lengthened high frequency signal is transmitted) makes approximately two revolutions in the time interval from $t_0$ to $t_1$.

Figure 4C:
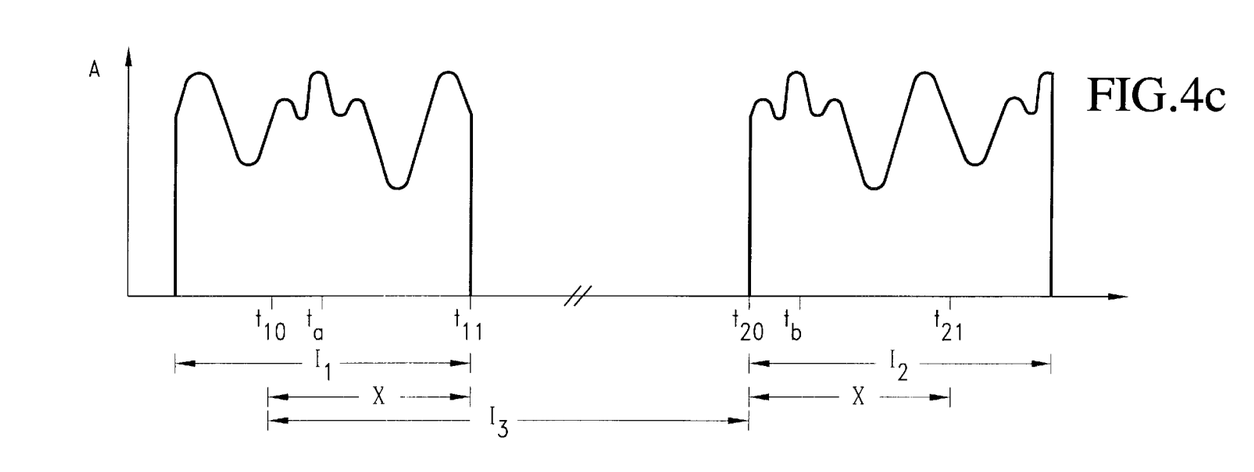
FIG. 4c is a lengthened high frequency signal generated by a tire pressure control device with the aid of which the allocation of this control device to a wheel position is undertaken; and, FIG. 4d is a plot for use in a method of the invention wherein the two time intervals $I_1$ and $I_2$ are the same length.

In connection with FIG. 4c, it is explained how, with the aid of the lengthened high frequency signals generated by the tire pressure control device 4a, the allocation of this control device 4a to a wheel position can be undertaken. At any desired time point, the tire pressure control device 4a first transmits its individual identifier and directly thereafter transmits a first lengthened high frequency signal extending over a first time interval $I_1$. The individual identifier and the first lengthened high frequency signal shown to the left in FIG. 4c are received by the central unit 10. At a desired later time point, the same tire pressure control device 4a again transmits to the central unit 10 its individual identifier and, directly thereafter, a second lengthened high frequency signal extending over a second time interval $I_2$. The second lengthened high frequency signal shown to the right in FIG. 4a is received by the central unit 10. The two time intervals $I_1$, $I_2$ are at least so long that the wheel 2a (from which the lengthened high frequency signals are transmitted) makes at least one revolution during this time interval. Preferably, both time intervals $I_1$ and $I_2$ have the same length.

In the central unit 10, the two received lengthened high frequency signals are so pushed over one another that a maximum overlapping of these signals results. From FIG. 4c, it can be seen that, for the example shown, the maximum overlapping region X in the first time interval $I_1$ is from time point $t_{10}$ to time point $t_{11}$ and, in time interval $I_2$, from time point $t_{20}$ to time point $t_{21}$.

In the two overlapping regions, the wheel 2a (from which the lengthened high frequency signal was transmitted) assumes the same angular position at time points corresponding to each other. For example, the same angular position is assumed by the wheel 2a at time point $t_{10}$ as in time point $t_{20}$ and the same angular position is assumed at time point $t_{11}$ as at time point $t_{21}$. This applies for all time points, which lie between the time points $t_{10}$ and $t_{11}$ or $t_{20}$ and $t_{21}$, when the time point, which lies between the time point $t_{20}$ and $t_{21}$, has the same spacing to $t_{20}$ as the time point, which lies between the time points $t_{10}$ and $t_{11}$, to the time point $t_{10}$.

The wheel 2a from which the lengthened high frequency signal has been transmitted, makes an integer number of revolutions between correspondingly selected time points, that is, for example, between the time points $t_{10}$ and $t_{20}$ (that is, in time interval $I_3$). With the aid of rpm sensors 12a to 12d, the central unit 10 checks which wheel of the motor vehicle has made an integer number of revolutions in time interval $I_3$. This takes place as already explained in connection with FIGS. 3a to 3d, so that, at this location, reference can be made to the explanation corresponding thereto. The individual identifier which was transmitted from the tire pressure control device 4a is allocated to the corresponding wheel position (in the example, forward right). The remaining tire pressure control devices 4b to 4d are assigned to their wheel positions in the same manner.

In FIG. 4c, it was presumed that the wheel 2a (from which the lengthened high frequency signal is transmitted) makes an equal number of revolutions in both time intervals $I_1$ and $I_2$. This is certainly correct (at least to a good approximation) if one assumes that the time spacing between the two time intervals amounts to only a few tenths of a second because only in the most rare cases during operation of a motor vehicle does the rotational speed of the motor vehicle wheel basically change in such a short time span.

Figure 4D:
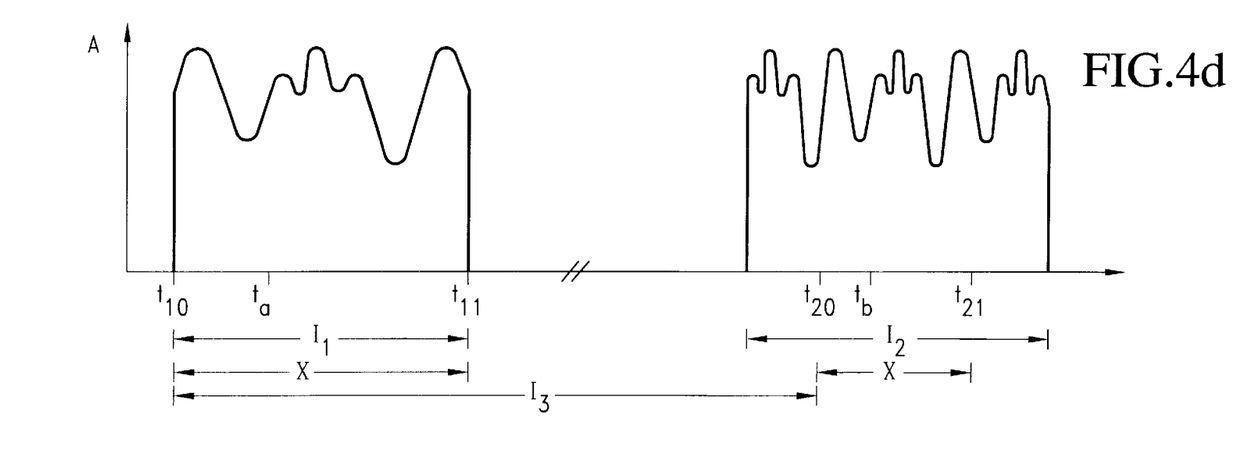

The method is explained in connection with FIG. 4d for the case that the two time intervals $I_1$ and $I_2$ are of the same length, that, in time interval $I_2$, the rotational speed of the wheel (from which the high frequency signal was transmitted) is, however, greater than in the time interval $I_1$. Before transmission of the lengthened high frequency signals, the tire pressure control device transmits its individual identifier to the central unit 10. For this reason, the central unit 10 knows that the first lengthened high frequency signal, which was transmitted in the time interval $I_1$, as well as the second high frequency signal, which was transmitted in the time interval $I_2$ originate from the same tire pressure control device. Further, the central unit knows that the wheel (from which the high frequency signals were transmitted) makes at least one revolution in both time intervals. For this reason, there must be coincident signal segments apart from a compression or expansion of the signal trace in both time intervals. If both signals cannot be brought into coincidence within some regions without compression or expansion, then the central unit compresses or expands one of the two signals before they are brought into coincidence. In this connection, it is determined in the central unit 10 that the wheel has assumed the same angular position in the overlapping region X between the time points $t_{10}$ and $t_{11}$ or between the time points $t_{20}$ and $t_{21}$ at time points which correspond to each other in each case. For example, the same angular position is assumed at the time points $t_{10}$ and $t_{20}$ or $t_{11}$ and $t_{21}$. The same applies to the times lying between the time points $t_{10}$ and $t_{11}$ or $t_{20}$ and $t_{21}$. For example, the wheel 2a has assumed the same angular position at time points $t_a$ and $t_b$ because the time point $t_a$ has the same relative spacing from the time point $t_{10}$ as the time point $t_b$ has from the time point $t_{20}$. Generally, it can be stated that the wheel 2a assumes precisely the same angular position at two time points $t_a$ and $t_b$ when the following applies:

$$t_a - t_{10}/t_{11} - t_{10} = t_b - t_{20}/t_{21} - t_{20}.$$

If there are two time points determined, in which the wheel 2a assumes a coincident angular position, then it is determined that the wheel has made an integer number of revolutions in the time interval $I_3$ between the two time points. The allocation of the individual identifier transmitted from the wheel 2a to the wheel position can then take place as already explained in connection with FIGS. 3a to 3d. The individual identifiers of the remaining tire pressure control devices 4b to 4d are allocated to the wheel positions in the same manner.

The method explained in connection with FIGS. 4c and 4d for finding the overlapping region of two signals is characterized as a cross correlation and is known to the person working in this area so that no further explanation should be needed with respect thereto.

It is understood that the foregoing description is and that of the preferred embodiments of the invention and that various changes and modifications may be made thereto without departing from the spirit and scope of the invention as defined in the appended claims.

What is claimed is:

1. In a tire pressure control system of a motor vehicle having a plurality of wheels at respective wheel positions, a method for allocating tire pressure control devices of the tire pressure control system to the wheel positions of the motor vehicle during the operation of said motor vehicle, the system further including:

a central unit;

said tire pressure control devices being assigned to corresponding ones of said wheels;

each of said tire pressure control devices functioning to transmit an individual identifier to said central unit at time intervals;

a plurality of rpm sensors assigned to corresponding ones of said wheels and said rpm sensors being fixedly mounted at respective ones of said wheel positions with the allocation of said rpm sensors to said wheel positions being known by said central unit; and, said central unit storing the allocation (identifier of the tire pressure control device/wheel position) for each of said wheels;

the method comprising the steps of:

causing one of said tire pressure control devices assigned to one of said wheels to transmit to said central unit, at any desired time point, its own individual identifier and a first lengthened high frequency signal, which extends over a first time interval $I_1$; and, as a consequence of a rotation of said one wheel, said signal having an individual trace dependent upon at least one of the rotational angle of said one wheel and the time;

causing said one tire pressure control device to transmit to said central unit, at any desired later time point, its own individual identifier and a second lengthened high frequency signal, which extends over a second time interval $I_2$, said second lengthened high frequency signal having the same individual trace at least segmentwise as said first lengthened high frequency signal, said individual trace of said second lengthened high frequency signal being dependent upon at least one of time and the rotational angle of said one wheel;

in said central unit, determining a first time point at which said one wheel assumes a desired relative angular position from said trace of said first lengthened high frequency signal;

in said central unit, determining a second time point at which said one wheel assumes the same relative angular position as said one wheel assumed at said first time point and said second time point being determined from said trace of said second lengthened high frequency signal;

in said central unit, determining the number of revolutions which said wheels have made in a third time interval $I_3$ from said first time point to said second time point and the number of revolutions for said wheels being determined from the signals of said rpm sensors;

in said central unit, checking which one of said wheels in which one of said positions had made an integer number of revolutions; and, in said central unit, assigning the corresponding wheel position to the individual identifier transmitted from said one tire pressure control device.

2. The method of claim 1, wherein each of said high frequency signals is transmitted from said one tire pressure control device at a constant maximum amplitude, which, as a consequence of the rotation of said one wheel, defines an individual trace in dependence upon at least one of the rotational angle of said one wheel and the time; and, said one wheel being that wheel from which the lengthened high frequency signal is transmitted.

3. The method of claim 1, wherein each time interval, during which a lengthened high frequency signal is transmitted from one of said wheels, is at least so long that said one wheel makes at least one revolution in said time interval.

4. The method of claim 1, wherein, in each of said tire pressure control devices, a specific length is pregiven which is the same for all lengthened high frequency signals transmitted from said one tire pressure control device.

5. The method of claim 4, wherein each one of said tire pressure control devices has a centrifugal force sensor, which generates a signal above a pregiven number of revolutions of said wheel to which said one tire pressure control device is assigned; and, said one tire pressure control device transmits a lengthened high frequency signal only when the signal of the centrifugal force sensor is present.

6. The method of claim 1, wherein said tire pressure control system has a central transmitter and each of said tire pressure control devices has a receiver; and, wherein said method comprises the further steps of:

said central transmitter transmitting a signal to all of said tire pressure control devices; and, directly after receiving said signal, each of said tire pressure control devices transmitting a lengthened high frequency signal to said central unit.

7. The method of claim 6, wherein said central transmitter has data as to the length of said lengthened high frequency signal which is to be transmitted by said tire pressure control devices and which is transmitted to said tire pressure control devices.

8. The method of claim 1, wherein said method is started by actuating a switch.

9. The method of claim 1, wherein said method is automatically started after switching on the ignition of said motor vehicle when said ignition was previously switched off for a pregiven time span.

10. The method of claim 1, wherein said signals are amplitude modulated which are transmitted from said tire pressure control devices; and, each of said lengthened high frequency pulses is a separate signal which is transmitted at a constant maximum amplitude.

11. The method of claim 1, wherein said signals are frequency modulated which are transmitted from said tire pressure control devices and are transmitted at a constant maximum amplitude; and, the individual identifier is contained in the lengthened high frequency signal.

12. The method of claim 1, wherein said first and second time points whereat said one wheel assumes a coincident relative angular position is determined by cross correlation in said first and second high frequency signals.

* * * * *